United States Patent [19]

Keskey et al.

[11] Patent Number: 4,644,032

[45] Date of Patent: * Feb. 17, 1987

[54] NON-GHOSTING PRESSURE SENSITIVE ADHESIVES

[75] Inventors: William H. Keskey; James E. Schuetz; Andrew D. Hickman, all of Midland, Mich.

[73] Assignee: The Dow Chemical Company, Midland, Mich.

[*] Notice: The portion of the term of this patent subsequent to Apr. 2, 2002 has been disclaimed.

[21] Appl. No.: 647,288

[22] Filed: Sep. 4, 1984

[51] Int. Cl.$^4$ .............................................. C08L 37/00
[52] U.S. Cl. .................................... 524/549; 524/272; 524/273; 524/274; 524/500; 524/516; 525/279; 526/260
[58] Field of Search .............. 524/549, 273, 274, 272, 524/516; 525/279; 526/260

[56] References Cited

U.S. PATENT DOCUMENTS

| | | | |
|---|---|---|---|
| 3,535,291 | 10/1970 | Riemhofer et al. | 526/270 |
| 4,189,418 | 2/1980 | Ueno et al. | 524/273 |
| 4,189,419 | 2/1980 | Takemoto et al. | 524/247 |
| 4,474,923 | 10/1984 | Keskey et al. | 524/458 |

Primary Examiner—Joseph L. Schofer
Assistant Examiner—J. M. Reddick

[57] ABSTRACT

A pressure-sensitive adhesive having non-ghosting characteristic comprising a latex of polymers having pendent oxazoline groups, coreactive groups and a tackifier. The latex comprises discrete polymer particles having both pendent oxazoline and coreactive groups or a blend of discrete polymer particles one portion of which has pendent oxazoline groups and the other portion of which has pendent coreactive groups. The oxazoline group is preferably 2-isopropenyl-2-oxazoline and the coreactive group is a carboxyl, sulfonic acid, anhydride, phenolic, hydroxyl, amide or amine group.

7 Claims, No Drawings

NON-GHOSTING PRESSURE SENSITIVE ADHESIVES

BACKGROUND OF THE INVENTION

The present invention is directed toward emulsion pressure sensitive adhesives which are non-ghosting.

Generally pressure sensitive adhesives are based upon styrene-butadiene polymers blended with tackifiers and dissolved in a solvent. The solvent is then evaporated to leave behind an adhesive film. The use of solvent based adhesives is however decreasing due to many undesirable factors such as cost, odor and potential health problems caused by the solvent evaporating into the atmosphere.

One alternative to solvent based adhesives is emulsion based adhesives. An obstacle encountered with emulsion based adhesives is a lack of cohesive strength which results in a deposit or residue of the adhesive on the adhered surface when the adhesive film is attempted to be removed. This phenomena is generally referred to as "ghosting". This ghosting phenomena is predominantly due to a weakness in the latex component of the pressure sensitive adhesive. Consequently it is desirable to formulate an emulsion polymer which could be employed in preparing a non-ghosting pressure sensitive adhesive.

SUMMARY OF THE INVENTION

The present invention provides for a pressure-sensitive adhesive composition having non-ghosting characteristics comprising a latex of polymers having pendent oxazoline groups and coreactive groups and a tackifier. The latex comprises discrete polymer particles having both pendent oxazoline and coreactive groups present thereon and/or discrete polymer particles one portion of which has pendent oxazoline groups and the other portion of which has pendent coreactive groups. The preferred pendent oxazoline group is formed from 2-isopropenyl-2-oxazoline and the preferred coreactive groups are carboxyl, sulfonic acid, anhydride, phenolic, hydroxyl, amide or amine groups. Further, the carboxyl coreactive groups are preferably formed from acrylic, methacrylic, fumaric, itaconic or maleic acid monomers. The tackifier generally comprises from about 1 to about 90 percent by weight on a solids basis in the formulation.

Generally, the present invention provides for a pressure-sensitive adhesive which does not ghost meaning that when it is removed from a surface it does not leave a deposit, residue or visible image where the pressure-sensitive adhesive was adhered.

DETAILED DESCRIPTION OF THE INVENTION

Generally the subject pressure-sensitive adhesive is prepared by blending a specifically formulated latex and a tackifier. The latex is a stable dispersion of polymeric substance in an essentially aqueous dispersion. The polymeric substance is prepared from discrete polymer particles having both pendent oxazoline and coreactive groups or by blending discrete polymer particles having pendent oxazoline groups with discrete polymer particles having pendent coreactive groups. The intent and purpose of the oxazoline and coreactive groups in either situation is that they are capable of reacting to form covalent bonds; therefore, their point of origin is not critical. Additionally a tackifier is blended with the latex to provide a sufficient amount of stickiness, quick stick or "grab" to form the subject pressure sensitive adhesive.

A unique aspect of the subject latex when formulated and dried to form a pressure sensitive adhesive is that when it is removed from a surface it does not leave a deposit, residue, or a visible image where the pressure-sensitive adhesive was adhered. This characteristic is herein defined as "non-ghosting". Thus an adhesive formed from the subject pressure sensitive adhesive can be applied to a surface and removed without ghosting.

The specifically formulated latex of polymers having oxazoline and coreactive groups which can be employed in preparing the subject pressure sensitive adhesive is disclosed in U.S. Pat. No. 4,474,923, entitled "Self Curable Latex Compositions" and U.S. Pat. No. 4,508,869, filed June 14, 1983, entitled "Latexes of Polymers Having Pendent Coreactive and Oxazoline Groups" both of which are incorporated herein by reference.

In one aspect the latex composition of this invention contains discrete polymeric particles of an oxazoline modified polymer. Said oxazoline modified polymer has been prepared by the emulsion polymerization of certain addition polymerizable oxazolines and at least one other copolymerizable monomer.

The oxazoline modified polymer also contains repeating units derived from at least one monomer which is not an oxazoline and which is copolymerizable with the aforementioned oxazoline. A broad range of addition polymerizable monomers are copolymerizable with said oxazoline and are suitable herein. Suitable monomers include, for example, the monovinyl aromatics, alkenes, esters of $\alpha,\oplus$-ethylenically unsaturated carboxylic acid; carboxylic acid esters wherein the ester group contains addition polymerizable unsaturation; halogenated alkenes; acyclic aliphatic conjugated dienes and the like. Small amounts of crosslinking monomers such as divinylbenzene may also be employed.

The latex further comprises discrete polymeric particles of a coreactive polymer. Said coreactive polymer particles are prepared in an emulsion polymerization process from an addition polymerizable monomer containing pendent groups which are capable of reacting with an oxazoline group to form a covalent bond thereto (hereinafter "coreactive monomer") and at least one other monomer which is copolymerizable with said coreactive monomer.

The other monomers suitably employed in the coreactive polymer particles are those which are copolymerizable with the coreactive monomer. In general, those monomers described hereinafter as being useful in the preparation of the oxazoline modified polymer are also useful in the preparation of the coreactive polymer. In fact, it is often desirable to "match" the polymer backbone of the coreactive polymer to that of the oxazoline modified polymer; that is, except for the oxazoline and coreactive monomers, to employ the same monomers in the same proportions in both the coreactive and oxazoline modified polymers. It is understood, however, the different monomers may be employed in the preparation of the oxazoline and coreactive polymers in order to obtain the particular characteristics desired.

The latex composition is prepared from the oxazoline modified latex and the coreactive latex by simple blending of the respective latexes in the desired proportion.

In general, the relative proportions of oxazoline modified and coreactive latexes are chosen such that the resulting latex composition contains from about 0.05 to about 20, preferably from 0.2 to about 5, more preferably from about 0.5 to about 2, equivalents of coreactive groups per equivalent of oxazoline group. In addition, better water and solvent resistance, as well as greater tensile strength is generally seen when the latex composition contains comparable amounts of particles of oxazoline-modified polymer and coreactive polymer. Preferably, the latex contains about 0.1 to 10, more preferably about 0.2 to about 5, most preferably about 0.40 to 2.5, particles of oxazoline-modified polymer per coreactive polymer particle. Such blending is advantageously performed at room temperature with mild agitation. The resulting product is an aqueous dispersion containing discrete particles of the oxazoline modified polymer and discrete particles of the acid polymer.

Advantageously, the respective particle sizes of the oxazoline-modified and the coreactive polymers, and the respective particle size distributions are such that the particles tend to pack together well to form dense, coherent films. The particles may all be of relatively uniform size, or may have different sizes such that the packing together of said particles upon film formation is enhanced.

In another aspect, the latex portion of this invention is prepared in a two-stage emulsion polymerization process. In the first stage of polymerization, a first monomer mix comprising an addition polymerizable coreactive monomer and at least one other monomer copolymerizable therewith is polymerized.

The coreactive monomers employed are those which contain pendent coreactive groups which are capable of reacting with an oxazoline group to form a covalent bond thereto. It is understood that the reaction of such coreactive groups with the oxazoline group will typically, but not necessarily, cause the oxazoline ring to open.

In addition to the coreactive monomer, the first monomer mix also contains at least one other monomer which is not a coreactive monomer and which is copolymerizable with the coreactive monomer. A broad range of addition polymerizable monomers are copolymerizable with said coreactive monomers and are suitable herein.

Suitable monomers include, for example, the monovinyl aromatics, alkenes, esters of $\alpha,\beta$-ethylenically unsaturated carboxylic acid; carboxylic acid esters wherein the ester group contains addition polymerizable unsaturation; halogenated alkenes; acyclic aliphatic conjugated dienes and the like.

The proportion of monomers used in the first monomer mix may vary considerably depending however, upon the coreactive monomer being employed in a relatively minor amount, e.g., from about 0.1 to about 20, preferably from about 1 to about 10 weight percent of the monomers. In general, the coreactive monomer is employed primarily to impart a self-curing characteristic to latex compositions and the other monomers employed to impart the other desired properties to the composition. For example, in a preferred acid/oxazoline-modified styrene/butadiene latex, the oxazoline modified polymer will advantageously exhibit properties similar to those commonly associated with styrene/butadiene polymers and the acid monomer contributes little except curing characteristics to the polymer.

It is noted that weak acid-containing polymers also often exhibit enhanced colloidal stability.

Upon completion of the polymerization of the first monomer mix, the pH of the resulting coreactive latex is adjusted, if necessary, into a range which is sufficiently high that during the subsequent polymerization of the second monomer mix containing oxazoline monomers, the oxazoline ring does not significantly react or hydrolyze. Typically, adjustment of the pH into the range from about 3 to about 11, preferably about 6 to about 11, more preferably from about 7 to about 10, is satisfactory. Any convenient water-soluble alkaline material, e.g., ammonium hydroxide, sodium hydrogen carbonate or sodium hydroxide, is advantageously employed to raise the pH.

To the coreactive latex is added a second monomer mix comprising an oxazoline monomer and at least one other addition polymerizable monomer which is not a coreactive monomer or an oxazoline and which is copolymerizable with the oxazoline monomer. This second monomer mix is added to the coreactive latex under conditions such that the monomers are polymerized within or around the coreactive latex particles. The general polymerization conditions employed are as described hereinbefore except that the pH of the aqueous phase is adjusted, if necessary, into the aforementioned range (i.e., sufficient to prevent substantial reaction or hydrolysis of the oxazoline monomer) during the polymerization reaction.

If necessary or desired, additional amounts of aqueous phase emulsifier, catalyst, initiator and the like may be added to the coreactive latex prior to or simultaneously with the addition of the second monomer mix in order to facilitate the polymerization thereof.

The second stage of the polymerization may be conducted immediately following the preparation of the coreactive latex. Alternatively, the coreactive latex may be prepared beforehand and stored until the second stage polymerization is conducted.

The other monomers employed in this second monomer mix is any addition polymerizable monomer which is not a coreactive monomer or an oxazoline and which is copolymerizable with said oxazoline. In general, those monomers described hereinbefore as useful in the first monomer mix are also usefully employed in the second monomer mix. It is often desirable to "match" the monomers employed in the first monomer mix with those in the second monomer mix, i.e., to employ the same or substantially similar monomers in the same or substantially similar proportions in both the first and second monomer mixes. For example, if styrene, butadiene and acrylic acid are employed in the first monomer mix a second monomer mix containing styrene, butadiene and oxazoline monomers can be employed to match said first and second monomer mixes. Of course, it is not necessary or always desirable to match the backbone of the first and second monomer mixes in the practice of this invention. More generally, the choice of other monomers in both the first and second monomer mixes is such that the resulting latex has the desired physical and chemical properties.

The proportions of monomers used in the second monomer mix may vary considerably depending on the particular end-use of the composition. Typically, however, oxazoline is employed in a relatively minor amount, e.g., from about 0.1 to about 20, and preferably from about 1 to about 10, weight percent of the monomers. In general, the oxazoline monomer is employed primarily to impart the self-curing characteristics to the latex and the other monomers are employed to impact the other desired properties to the latex.

Advantageously, the second monomer mix contains from about 0.05 to about 20, preferably about 0.2 to about 5, more preferably from about 0.5 to about 2, moles of oxazoline monomer per mole of coreactive monomer employed in the first monomer mix. Most preferably, the amount of oxazoline monomer employed is substantially equivalent on a molar basis to the amount of acid employed.

Following the polymerization of the second monomer mix, there is obtained a curable latex composition. Such composition comprises discrete polymer particles which polymer particles have been prepared by the addition polymerization of monomer comprising (a) a coreactive monomer, (b) an oxazoline monomer as described hereinbefore and (c) at least one other addition polymerizable monomer. When the other monomer in the first monomer mix is different from the other monomers employed in the second monomer mix, the resulting latex particles will have been prepared from, in addition to the oxazoline monomers, at least two other addition polymerizable monomers. While not intending to be bound by theory, it is believed that the polymer particles in the latex of this invention are structured latexes in the polymers prepared in the second monomer mix to either encapsulate or interpenetrate the polymers prepared from the first monomer mix. However, it is recognized that during the polymerization of said second monomer mix, certain amounts of graft of block copolymers may be formed. The precise polymeric structure of the polymer particles is not considered critical to this invention. Essential features of the polymer particles are that such particles contain both pendent coreactive groups and pendent oxazoline groups.

Advantageously, the polymer particles have a particle size distribution such that, upon film formation, the particles can become relatively closely packed together to form coherent films.

The oxazolines employed herein are as represented by the general structure:

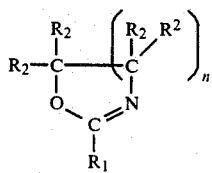

wherein $R_1$ is an acyclic organic radical having addition polymerizable unsaturation; each $R_2$ is independently hydrogen, halogen or an organic radical and n is 1 or 2. Preferably, $R_1$ is

wherein $R_3$ is hydrogen or an alkyl radical. Most preferably, $R_1$ is an isopropenyl group. Each $R_2$ is preferably a hydrogen or alkyl group with hydrogen being most preferred; n is preferably 1. Most preferably, the oxazoline is 2-isopropenyl-oxazoline.

The coreactive monomers employed herein are those which contain pendent coreactive groups which are capable of reacting with an oxazoline group to form a covalent bond thereto. It is understood that the reaction of such coreactive groups with the oxazoline group will typically, but not necessarily, cause the oxazoline ring to open.

Typically, the pendent coreactive group on the coreactive monomer will contain a reactive hydrogen atom. Exemplary coreactive groups containing an active hydrogen atom include weak acid groups, aliphatic alcohols; aromatic alcohols, i.e., phenols; amines and amides, i.e., —$CONH_2$ and —CONH— groups. In general, the more reactive of such groups, i.e., those having the more labile hydrogen, such as the acids and aromatic alcohols, are preferred herein. Such more reactive groups will generally react with the oxazoline ring more readily under milder conditions than the less reactive groups such as the amines and aliphatic alcohols. Amide groups are generally intermediate in reactivity.

Especially preferred are monomers containing pendent weak acid groups or acid anhydride groups, especially ethylenically unsaturated monomers containing weak acid or acid anhydride groups. Exemplary of suitable monomers containing carboxylic acid groups include itaconic acid, acrylic acid, methacrylic acid, fumaric acid, maleic acid, vinylbenzoic acid and isopropenylbenzoic acid. The more preferred species include acrylic, methacrylic, fumaric, itaconic and maleic acids. Maleic anhydride is an example of a suitable monomer containing an acid anhydride group.

Suitable coreactive monomers containing phenolic groups include ortho- and meta-vinyl phenol.

Suitable coreactive monomers containing aliphatic hydroxyl groups include, for example, hydroxyethylacrylate, hydroxypropylmethacrylate and N-hydroxyethyl-N-methyl acrylamide. Derivatives of styrene having aliphatic hydroxyl groups are also useful herein.

Suitable coreactive monomers containing amide groups include acrylamide, methacrylamide, vinyl acetamide and α-chloroacrylamide. N-methylacrylamides and N-methylmethacrylamide are examples of monomers containing —CONH— groups.

Suitable coreactive monomers containing amine groups include allyl amine, 2-aminoethylacrylate, 3-aminoethylmethacrylate and the like.

As used herein above the term "monovinyl aromatic monomer" is intended to include those monomers wherein a radical of the formula:

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene, α-methylstyrene, ortho, meta and para-methylstyrene; ortho, meta- and para-ethylstyrene; o,p-dimethylstyrene; o,p-diethylstyrene; isopropylstyrene; o-methyl-p-isopropylstyrene; p-chlorostyrene; p-bromostyrene; o,p-dichlorostyrene; o,p-dibromostyrene; vinylnaphthalene; diverse vinyl (alkylnaphthalenes) and vinyl (halonaphthalenes) and comonomeric mixtures thereof. Because of considerations such as cost, availability, ease of use, etc., styrene and vinyltoluene are preferred and styrene is especially preferred as the monovinyl aromatic monomer.

Alkenes suitably employed herein include the monounsaturated aliphatic organic compounds such as ethylene, N and isopropylene, the diverse butenes, pentenes, hexenes and the like as well as alkenes containing diverse substituent groups which are inert to the polymerization thereof. Preferred are unsubstituted $C_2C_8$ alkenes with $C_2C_4$ unsaturated alkenes being most preferred.

Esters of $\alpha,\beta$-ethylenically unsaturated carboxylic acids useful herein include typically soft acrylates (i.e., those whose homopolymers have a glass transition temperature ($T_g$) of less than about 25° C.) such as benzyl acrylate, butyl acrylate, sec-butyl acrylate, cyclohexyl acrylate, dodecyl acrylate, ethyl acrylate, 2-ethylbutyl acrylate, 2-ethylhexyl acrylate, heptyl acrylate, hexyl acrylate, isobutyl acrylate, isopropyl acrylate, methyl acrylate, propyl acrylate, etc.; hard acrylates (i.e., those whose homopolymers have a $T_g$ of greater than about 25° C.) such as 4-biphenylyl acrylate and tert-butyl acrylate; soft methacrylates such as butyl methacrylate, and hexyl methacrylate; and hard methacrylates such as sec-butyl methacrylate, tert-butyl methacrylate, cyclohexyl methacrylate, ethyl methacrylate, isobutyl methacrylate, isopropyl methacrylate, methyl methacrylate, propyl methacrylate, etc. The cost, availability and known properties of butyl acrylate and ethyl acrylate make these monomers preferred among the acrylates. The cost, availability and known properties of methyl methacrylate make it preferred among the methacrylates.

Halogenated alkenes useful herein include, for example, vinyl chloride, vinylidene chloride, vinyl fluoride, vinylidene fluoride, the diverse polychloro, polyfluoro- and polybromo-alkenes and the like.

Acyclic aliphatic conjugated dienes usefully employed herein include typically those compounds which have from about 4 to about 9 carbon atoms, for example, 1,3-butadiene, 2-methyl-1,3-butadiene; 2,3-dimethyl-1,3-butadiene; pentadiene; 2-neopentyl-1, 3-butadiene and other hydrocarbon analogs of 2,3-butadienes, such as 2-chloro-1, 3-butadiene; 2-cyano-1, 3-butadiene, the substituted straight chain conjugated pentadienes, the straight chain and branched chain conjugated hexadienes, other straight and branched chain conjugated dienes having from 4 to about 9 carbon atoms, and comonomeric mixtures thereof. The 1,3-butadiene hydrocarbon monomers such as those mentioned hereinbefore provide interpolymers having particularly desirable properties and are therefore preferred. The cost, ready availability and the excellent properties of interpolymers produced therefrom makes 1,3-butadiene the most preferred acyclic aliphatic conjugated diene.

Mixtures of two or more of the foregoing monomers may, of course, be employed herein, if desired. Of the foregoing monomers, most preferred are styrene, mixtures of styrene and butadiene, butyl acrylate, methyl methacrylate and vinyl acetate.

The latex compositions as described are conveniently polymerized using substantially conventional emulsion polymerization and techniques in aqueous medium with conventional additives. Typically, the aqueous phase will contain from about 0.5 to about 5 weight percent (based on the monomer charge) of conventional nonionic or anionic emulsifiers (e.g., potassium, N-dodecyl sulfonate, sodium isooctobenzene sulfonate, sodium laurate, nonyl phenol ethers of polyethylene glycols and the like).

Conventional emulsion polymerization catalyst can be employed in the foregoing latex polymerization and common examples thereof include peroxides, persulfates, azo compounds and the like such as sodium persulfate, potassium persulfate, ammonium persulfate, hydrogen peroxide, azodiisobutyric diamide as well as catalysts (e.g., redox catalysts) which are activated in the water phase (e.g., by a water-soluble reducing agent). The type and amount of catalyst, as well as the particular polymerization conditions employed, will typically depend on the other monomers which are used and polymerization conditions will be generally selected to favor the polymerization of such other monomers. Typically, such catalysts are employed in a catalytic amount, e.g., ranging from 0.01 to about 5 weight percent based upon the monomer weight. In general, the polymerization is conducted at a temperature in the range of from about 10° to about 110° C. (preferably from about 50° to about 90° C.). When the coreactive monomer is one containing pendent weakly acidic groups as described hereinbelow, such as carboxyl groups, the polymerization is advantageously conducted under conditions sufficiently acidic to promote the copolymerization of the weakly acidic coreactive monomers with the other monomers being employed. In such case, the pH is preferably between about 1 and about 6, more preferably between about 1 to about 4. The polymerization may be conducted continuously, semi-continuously or batch-wise.

Similarly, conventional chain transfer agents such as, for example, n-dodecyl mercaptan, bromoform, carbon tetrachloride and the like can also be employed in the normal fashion in the aforementioned first stage polymerization to regulate the molecular weight of the polymer formed therein, and typically, when such chain transfers are used, they are employed in amounts ranging from 0.01 to about 10 (preferably from about 0.1 to about 5) weight percent based upon the weight of the monomers employed in the polymerization. The amount of chain transfer agent employed depends somewhat on the particular transfer agent employed and the particular monomers being polymerized.

Suitable latex polymerization procedures are taught, for instance, in U.S. Pat. Nos. 4,419,481; 4,325,856; 4,001,163; 3,513,121; 3,575,913; 3,634,298; 2,399,684; 2,790,735; 2,880,189; and 2,949,386.

The pressure-sensitive adhesive of this invention comprises the latex composition described above and a tackifying resin emulsion or tackifier. The tackifying resins useful in the preparation of the pressure sensitive adhesive are commercially available and are generally disclosed in U.S. Pat. No. 4,189,419 herein incorporated by reference. Typically the resins comprise emulsified resin, partially decarboxylated rosin, glycerol ester of polymerized rosin, partially dimerized rosin, natural resin, hydrogenated wood rosin, plasticized hydrogenated rosin, aliphatic hydrocarbon resins derived from petroleum, aromatic resins derived from petroleum, terpene resins, coal tar polyindene resins, ethylene vinyl acetate copolymer resins, terpene phenolics, coumarone-indenes, rosin esters, pentaerythritol esters, and polydicyclobutadiene resins. The properties of the adhesive composition can be varied for particular applications by the selection of an appropriate tackifying resin.

Naturally the particular tackifiers employed can contain conventional additives such as softeners, plasticizers, antioxidants and the like which can be emulsified along with the tackifying resin or emulsified separately and mixed with the tackifying resin emulsion.

Tackifiers are desirably added in an amount such that the latex is given additional tack (quick stick and peel adhesion) without detracting unduly from the shear adhesion. Suitable formulations will typically have about 1 to about 90 percent, preferably about 20 to about 80 percent, and most preferably from about 30 to about 50 percent by weight on a solids basis in the formulation.

Typically the pressure-sensitive adhesive composition can be prepared by blending the desired amount of latex and tackifier in any conventional manner. It is understood that no requirement or limitation to the scope of the invention is intended as to how the latex and tackifier components are combined.

The following examples are provided to illustrate specific embodiments of the present invention.

EXAMPLE I

A. Preparation of Carboxylated Portion of the Copolymer

Into a 2-gallon jacketed automated reactor is added 60 parts per 100 part monomer (phr) of water, 0.01 phr of Versenex ® 80, a trademark of The Dow Chemical Company or a chelating agent of a 1 percent solution of the pentasodium salt of (carboxymethyl-imino)bis-(ethylenenitrilo)tetraacetic acid, and 2.7 phr of a seed latex containing polystyrene particles having a volume average particle size of about 260 Å. The reaction is purged with nitrogen and heated to 90° C.

Over a four hour period is added monomer streams containing 33 phr of styrene and 65 phr butadiene, with 2 phr of carbon tetrachloride and 2 phr of (T-DDM) t-dodecyl mercaptan. Simultaneously is added an aqueous mixture consisting of 18 phr of deionized water, 0.7 phr of sodium persulfate and 0.5 phr (Dowfax) 2A1 surfactant sodium salt of dodecylated sulfonated phenyl ether.

After 15 minutes the carboxyl containing monomer stream is added which consisted of 18 phr of water, 0.14 phr of sodium hydroxide and 2 phr of itaconic acid. The polymerization mixture was maintained at 3.8 pH and after the addition of all the monomer (3 hours) and aqueous streams the mixture was heated for an additional hour at 90° C. and then cooled. The 48.1 percent solids latex was steam distilled and the product (hereinafter, designated latex A) was styrene/butadiene/itaconic acid.

(B) Preparation of Copolymer

Into a 1-gallon stainless steel reactor was added 80 phr of the latex prepared in part A, latex A, the pH was then raised from 3.8 to 9.1 with a 28 percent solution of NH4OH. To this mixture was added a mixture of 19.8 parts water, 0.002 parts Versenex ® 80 and 0.10 part sodium persulfate. Then a 20 phr monomer mix of 20 parts styrene, 15 parts 2-isopropenyl-2-oxazoline (IPO) and 2 parts t-dodecylmercaptan was added. The reactor was then purged with nitrogen and 65 parts butadiene added. The reaction mixture was then heated to 90° C. for 3 hours and then cooled. The latex was steam distilled and stabilized at 7.2 pH.

The product hereinafter, designated latex B, was a 42.1 percent solids latex wherein latex A containing the coreactive group itaconic acid was employed as an 80 percent seed and 20 percent monomer (styrene/butadiene/IPO/-t-dodecylmercaptan) was further polymerized therewith to give the IPO modified latex. The resultant latex contains polymer particles having both pendent acid and pendent oxazoline groups, as confirmed by infrared spectroscopy.

(C) Preparation of Pressure-Sensitive Adhesive

A formulation of 60 percent latex as prepared in Step B to 40 percent modified hydrocarbon resin tackifier or resin ester tackifier (dry basis) was prepared. In particular, a tackifier (Hercules Picconol A-600E Tackifier) was employed to prepare the pressure-sensitive adhesive.

EXAMPLE II

(A) Preparation of Oxazoline Modified Latex

In a batch polymerization process, 157 phr deionized water, 0.01 phr of Versenex ® 80, 5 phr of Dresinate ® 214 surfactant (available commercially from Hercules, Inc.) and 0.5 phr of sodium persulfate was added to a 1-gallon reactor. The reactor was agitated and purged with nitrogen. The monomer portion added to the batch consisted of 7.5 phr 2-isopropenyl-2-oxazoline (IPO), 22.5 phr styrene and 70 phr butadiene. The mixture was polymerized for 6 hours at 60° C. and then cooled. The reactor was opened and 0.5 phr of sodium dimethyl dithiocarbamate and 10.0 phr of deionized water was added. The latex was then steam distilled to remove unreacted monomer.

The resultant latex contains 32.3 percent solids and is a terpolymer of butadiene/styrene/IPO.

(B) Preparation of Latex Blend

To the latex prepared above is blended latex A which contains itaconic acid as prepared in Example I, part A. Specifically a blend was formulated of 60 percent latex A and 40 percent oxazoline modified latex as prepared above (Example II, part A).

(C) Preparation of Pressure Sensitive Adhesive

To the latex blend prepared in part B, above, was additionally blended a tackifier to prepare a pressure-sensitive adhesive. Specifically a formulation consisting of 60 percent latex and 40 percent tackifier was prepared wherein the tackifier was Hercules FORAL ® 85 (rosin ether tackifier commercially available from Hercules, Inc.).

The pressure-sensitive adhesives as prepared in Examples I and II were tested under conditions described in the Pressure Sensitive Tape Counsil procedures (Peel Adhesion PSTC-1, Quick Stick PSTC-5 and Shear Adhesion PSTC-7). In addition to the subject adhesives similar compositions were prepared in the absence of oxazoline modifiers in order to indicate the effect of the subject IPO modified latex employed as a pressure-sensitive adhesive.

All the pressure-sensitive adhesive compositions were coated on 2-mil Mylar with a #30 Meyer rod and dried at 115° C. for 3 minutes after aging overnight at 50 percent relative humidity and 22° C., the samples were tested for adhesive properties and ghosting. The adhesive properties are shown below in Table I.

TABLE I

Pressure-Sensitive Adhesive (PSA) Test Results

| PSA[1] | Peel Adhesion PSTC-1 (lb/in) | Quick Stick PSTC-5 (lb/in) | Shear Bond[6] PSTC-7 (Hrs.) |
|---|---|---|---|
| Latex A, Control[2] | 1.6 | 1.4 | 23 |
| Example I[3] | 1.5 | 1.0 | 38 |
| Latex, Control[4] | 1.5 | 1.0 | 5.2 |
| Example II[5] | 3.0 | .8 | >300 |

[1]Pressure-sensitive adhesive formulation of 60/40 Latex/Hercules Picconol A-600E Tackifier
[2]Not an example of invention, latex component was prepared as in part A of Example I
[3]PSA as prepared in part C of Example I
[4]Not an example of invention, latex component was 65/35 Butadiene/Styrene.
[5]PSA prepared in part C of Example II
[6]Test conditions were ¼ inch by ¼ inch by 500 grams at 22° C., 50 percent relative humidity.

The data from Table I indicates that the subject compositions (Ex. I and II) are acceptable pressure-sensitive adhesives. Example II showed very good adhesion values and; therefore, the latex portion which is a blend of the latex particles independently having oxazoline or coreactive groups is the preferred choice for preparing a pressure-sensitive adhesive from an adhesive standpoint.

Further the subject pressure-sensitive adhesive compositions were tested for a ghosting characteristic. The ghosting characteristic is typically a failure of the latex portion of the pressure-sensitive adhesive to release from a surface it is adhered, i.e., cohesive failure. The latex component alone and the formulated latex-tackifier pressure-sensitive adhesive were both tested for ghosting. Latex or formulated latex-tackifier were coated on 2-mil Mylar ® with a #30 Meyer rod and dried at 115° C. for 3 minutes. After aging overnight at 50 percent relative humidity and 22° C., 2.54 cm (1 inch) strips of the samples were applied to a photographic chromed steel plate with a weighted roller and placed in a 149° C. forced air oven for 1.5 hours. On removal one half of each individual sample was pulled from the photographic plate while hot. The remainder of each sample was cooled to room temperature and then pulled. The condition of the plate was noted after both the hot and cold pull for ghosting. The results of this testing are compiled in Table II. A cohesive failure is a failure of the adhesive compositions or latex itself and such failure would result in severe ghosting. Therefore, in Table II where cohesive failure is noted this indicates ghosting.

TABLE II

| Sample | Ghosting Analysis Hot Pull | Cold Pull |
|---|---|---|
| 1. Latex A[1] | adhesive separated from Mylar ® | cohesive failure |
| 2. Latex B[2] | adhesive separated from Mylar ® | clean, no ghosting |
| 3. Latex, Control[3] | cohesive failure | cohesive failure |
| 4. Example II[4] | clean, no ghosting | clean, no ghosting |

[1]Not an example of Invention; latex as prepared in part A of Example I.
[2]Latex as prepared in part B of Example I i.e., latex component of invention.
[3]Not an example of Invention; latex was 65/35 Butadiene/Styrene.
[4]Pressure-Sensitive adhesive as prepared in part C of Example II.

Table II shows that the latex of the invention, Sample 2, and the pressure-sensitive adhesive, Example 4, did not ghost while the controls, Samples 1 and 3 had cohesive failure which means they did ghost.

What is claimed:

1. A pressure-sensitive adhesive composition having non-ghosting characteristics comprising:
   (A) a latex composition prepared from addition polymerizable monomers comprising:
      (i) monomer containing pendent coreactive groups capable of reacting with an oxazoline group to form a covalent bond thereto,
      (ii) monomer containing pendent oxazoline groups as represented by the general structure:

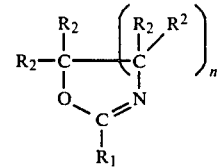

wherein $R_1$ is an acyclic organic radical having addition polymerizable unsaturation, $R_2$ is independently hydrogen, halogen or an organic radical and n is 1 or 2, and
      (iii) at least one other addition polymerizable monomer which does not contain a coreactive or oxazoline group; and
   (B) a tackifier in an amount whereby said latex composition is given additional tack.

2. The composition of claim 1 wherein said latex comprises discrete polymer particles having both pendent oxazoline and coreactive groups present thereon.

3. The composition of claim 1 wherein said latex comprises a blend of discrete polymer particles one portion of which has pendent oxazoline groups and the other portion of which has pendent coreactive groups.

4. The composition of claim 1 wherein said pendent oxazoline group is formed from 2-isopropenyl-2-oxazoline.

5. The composition of claim 1 wherein said coreactive group is a carboxyl, sulfonic acid, anhydride, phenolic, hydroxyl, amide or amine group.

6. The composition of claim 5 wherein said carboxyl coreactive group is formed from acrylic, methacrylic, fumaric, itaconic or maleic acid monomers.

7. The composition of claim 1 wherein said tackifier comprises from about 1 to about 90 percent by weight on a solids basis in the formulation.

* * * * *

UNITED STATES PATENT AND TRADEMARK OFFICE
CERTIFICATE OF CORRECTION

PATENT NO. : 4,644,032

DATED : February 17, 1987

INVENTOR(S) : William H. Keskey, et al.

It is certified that error appears in the above-identified patent and that said Letters Patent is hereby corrected as shown below:

Cover Page [56], References Cited, add
-- 4,508,869 4/1985 Keskey et al. ........ 524/808 --.

Col. 2, line 17, "4,508,869, filed June 14, 1983, entitled" should read -- 4,508,869, entitled --.

Col. 2, line 34, "⊕" should read --$\beta$--.

Col. 6, line 40, "--CONH--" should read -- (CONH) --.

Col. 9, line 26, "Company or a" should read -- Company for a --.

Col. 10, line 50, "ether" should read -- ester --.

Signed and Sealed this

First Day of December, 1987

Attest:

DONALD J. QUIGG

Attesting Officer     Commissioner of Patents and Trademarks